(12) United States Patent
Nenadic et al.

(10) Patent No.: US 11,273,504 B2
(45) Date of Patent: Mar. 15, 2022

(54) TABLE SAW INSERT WITH LOCK-DOWN MECHANISM

(71) Applicant: SawStop Holding LLC, Tualatin, OR (US)

(72) Inventors: John P. Nenadic, Camas, WA (US); James F. W. Wright, Sherwood, OR (US); Stephen F. Gass, West Linn, OR (US)

(73) Assignee: SawStop, Holding LLC, Tualatin, OR (US)

( * ) Notice: Subject to any disclaimer, the term of this patent is extended or adjusted under 35 U.S.C. 154(b) by 0 days.

(21) Appl. No.: 16/819,837

(22) Filed: Mar. 16, 2020

(65) Prior Publication Data

US 2020/0215629 A1  Jul. 9, 2020

Related U.S. Application Data

(63) Continuation of application No. 12/931,809, filed on Feb. 11, 2011, now Pat. No. 10,589,366.

(60) Provisional application No. 61/338,493, filed on Feb. 19, 2010.

(51) Int. Cl.
*B23D 47/02* (2006.01)
*B23D 45/06* (2006.01)

(52) U.S. Cl.
CPC ........... *B23D 47/025* (2013.01); *B23D 45/06* (2013.01); *Y10T 83/773* (2015.04)

(58) Field of Classification Search
CPC ...... B23D 47/025; B23D 47/00; B23D 45/00; B23D 45/06; B23D 45/061; B23D 45/068; Y10T 83/773; Y10T 83/7693; Y10T 83/7697; Y10T 83/7701; Y10T 83/7705; Y10T 83/7726; Y10T 83/7684; Y10T 83/7722; Y10T 83/8794; Y10T 83/8795
USPC .................................. 144/1.1, 286.1, 286.5
See application file for complete search history.

(56) References Cited

U.S. PATENT DOCUMENTS

| | | |
|---|---|---|
| 1,183,383 A | 5/1916 | Jenkins |
| 2,008,673 A | 7/1935 | Ocenasek |
| 2,403,247 A | 7/1946 | Sullivan |
| 2,569,914 A | 10/1951 | Appleton |
| 2,615,479 A | 10/1952 | Bearup |
| 2,810,412 A | 10/1957 | Roug |
| 3,007,244 A * | 11/1961 | Austin ............... B26B 5/006 30/162 |
| 3,269,433 A | 8/1966 | Packard et al. |
| 3,289,713 A | 12/1966 | Herzog |
| 3,490,637 A | 1/1970 | Pope |
| 3,866,502 A | 2/1975 | Brewer, Sr. |
| 4,031,934 A | 6/1977 | Stadler |
| 4,058,070 A | 11/1977 | Jones |
| 4,150,633 A | 4/1979 | Adams |
| 4,159,003 A | 6/1979 | Johnson et al. |
| 4,194,456 A | 3/1980 | Edwards et al. |

(Continued)

FOREIGN PATENT DOCUMENTS

| | | |
|---|---|---|
| CA | 731978 A | 4/1966 |
| IT | 430939 | 2/1948 |

*Primary Examiner* — Phong H Nguyen

(57) ABSTRACT

Inserts for table saws are disclosed. The table inserts are equipped with a toolless locking mechanism that mechanically holds the insert in place and which allows for the installation and removal of the insert without the use of tools. The locking mechanism is easy to lock and unlock and yet robust enough to hold a zero-clearance insert in place.

3 Claims, 12 Drawing Sheets

(56) References Cited

U.S. PATENT DOCUMENTS

| | | | |
|---|---|---|---|
| 4,335,765 A | | 6/1982 | Murphy |
| 4,350,193 A | | 9/1982 | McCambridge et al. |
| 4,395,962 A | | 8/1983 | Odermann |
| 4,487,330 A | | 12/1984 | Grover et al. |
| 4,543,866 A | | 10/1985 | Maier et al. |
| 4,635,692 A | | 1/1987 | Hulse et al. |
| 4,694,763 A | | 9/1987 | Adams |
| 5,013,195 A | | 5/1991 | Strazar |
| 5,022,156 A | * | 6/1991 | Kallens ............... B26B 5/00 30/125 |
| 5,159,864 A | | 11/1992 | Wedemeyer et al. |
| 5,231,906 A | | 8/1993 | Kogej |
| 5,725,038 A | | 3/1998 | Tucker et al. |
| 5,855,234 A | | 1/1999 | Everts et al. |
| 5,857,507 A | | 1/1999 | Puzio et al. |
| 5,901,631 A | | 5/1999 | Minarovic |
| 5,970,835 A | | 10/1999 | Kenyon et al. |
| 6,076,445 A | | 6/2000 | Kenyon et al. |
| 6,418,829 B1 | | 7/2002 | Pilchowski |
| 6,422,116 B1 | * | 7/2002 | Kenyon ............ B23D 47/025 144/1.1 |
| 6,431,042 B1 | | 8/2002 | Brault et al. |
| 7,134,373 B1 | * | 11/2006 | Vice ............... B23D 47/025 83/477.2 |
| 8,087,173 B2 | * | 1/2012 | Tang ................... B25F 1/04 30/157 |
| 2004/0159200 A1 | | 8/2004 | Stoffel |
| 2006/0219076 A1 | | 10/2006 | Gass et al. |
| 2009/0293692 A1 | | 12/2009 | Gass et al. |

* cited by examiner

TABLE SAW INSERT WITH LOCK-DOWN MECHANISM

CROSS-REFERENCE TO RELATED APPLICATION

This application is a continuation of Ser. No. 12/931,809, filed Feb. 11, 2011, which claims the benefit of and priority from U.S. Provisional Patent Application Ser. No. 61/338,493, filed Feb. 19, 2010. All of the above listed patent applications are hereby incorporated by reference in their entireties.

TECHNICAL FIELD

The present invention relates to inserts for table saws. The insert includes a lock-down mechanism to hold the insert in place.

BACKGROUND

In a workshop environment, such as a wood-working workshop, a table saw is commonly used to cut a workpiece, such as a piece of wood, plastic, metal or the like. A table saw is a piece of power equipment that has a flat table to support a workpiece, and a blade extends up through an opening in the table. The workpiece is placed on the table and pushed forward into the spinning blade to make a cut.

In order to access the portion of the blade that is below the table surface for changing the blade or for other tasks, an opening is left in the table, and during use, the opening is filled by a removable table insert. The insert has a flat surface to match the surface of the table and a slot through which the blade extends. It is important that the table insert be secured in the saw so that it does not come loose while the blade is spinning, as this would create a hazard.

Some inserts are designed as "zero-clearance" inserts. A zero-clearance insert has a slot that matches as closely as possible the profile or width of the blade. To achieve this, a zero-clearance insert is manufactured without a slot for the blade. The zero-clearance insert is then installed in a saw with the blade lowered to a position below the table surface. The motor is turned on so that the blade spins and the spinning blade is slowly raised so that is cuts through the zero-clearance insert, leaving a slot in the insert that matches as closely as possible the profile of the blade. It is particularly important that the table insert be securely kept in place during this process.

In the past, inserts have been held in place by screws that extend through a hole in the insert and thread into a bore in the table. Such a configuration, however, makes it inconvenient for a user to install or remove the insert because a screwdriver would be required. Also, the screw could be lost or a screwdriver might not be readily available.

This document describes a table insert designed for a table saw which mechanically, and easily, locks in place without the use of tools.

DETAILED DESCRIPTION

Figure 1:
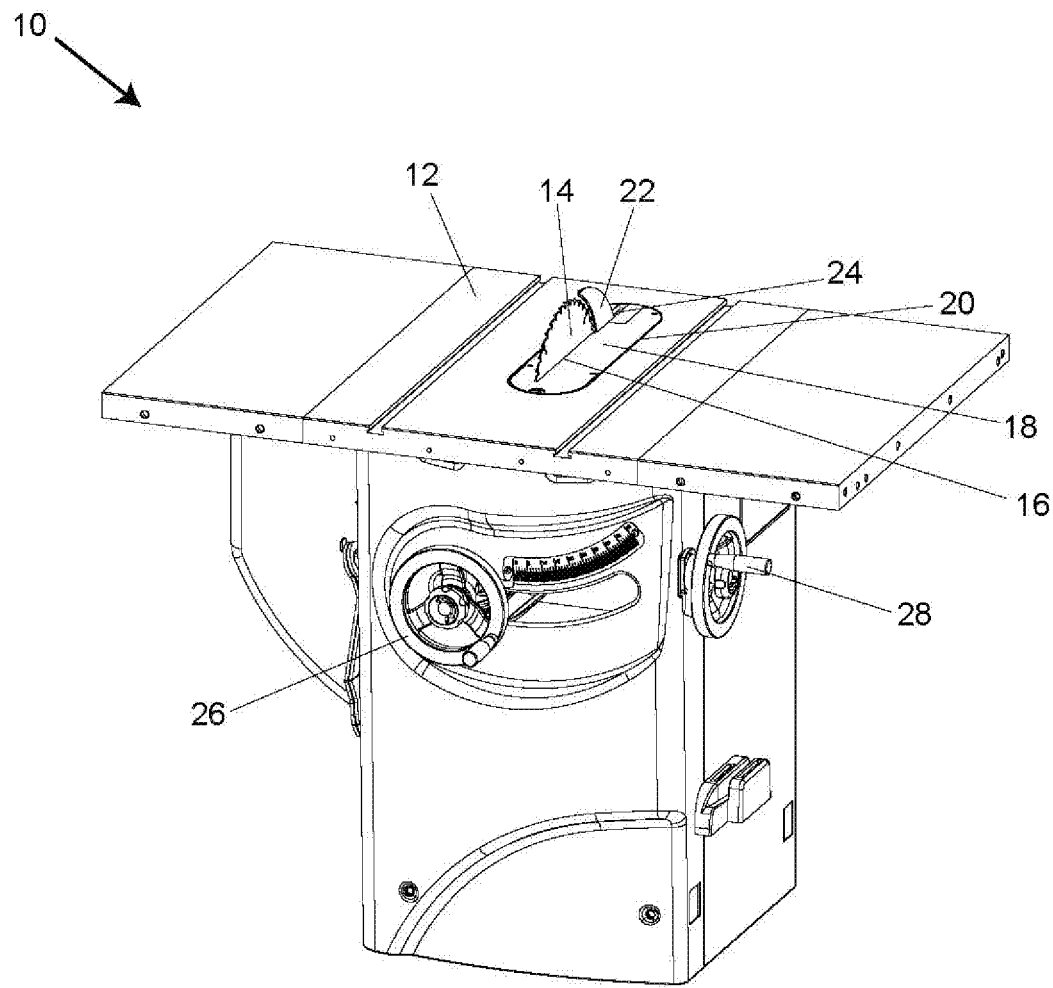
FIG. 1 shows a table saw.

A table saw 10 is shown in FIG. 1. Saw 10 includes a table 12 and a circular blade 14. The blade extends up through a slot 16 in a table insert 18. The insert fits within an opening 20 in the table and the top surface of the insert is nominally co-planar with the top surface of the table. A piece of wood, or other material to be cut, is placed on the table and pushed into contact with the spinning blade to make a cut. A riving knife 22, or similar component such as a splitter, is mounted under the table behind the blade and also extends up through a slot 24 in table insert 18. Both the riving knife (or splitter) and the blade can be moved up and down together by turning hand wheel 26, and can be tilted from zero to forty-five degrees to the left by turning hand wheel 28. Slots 16 and 24 in the table insert accommodate this movement.

As stated, table insert 18 covers opening 20 in table 12 of the saw. Opening 20 is an oblong opening with straight sides and semi-circles at each end. Opening 20 surrounds the blade and riving knife and is large enough to allow access to the internal saw assembly so that the operator of the saw can change the blade, install or remove the riving knife, or perform other maintenance tasks. Table insert 18 is shaped to closely fit within opening 20 and is designed to sit flush or nearly flush with the table surface so that a workpiece may glide smoothly over the table insert without interference.

Figure 2:
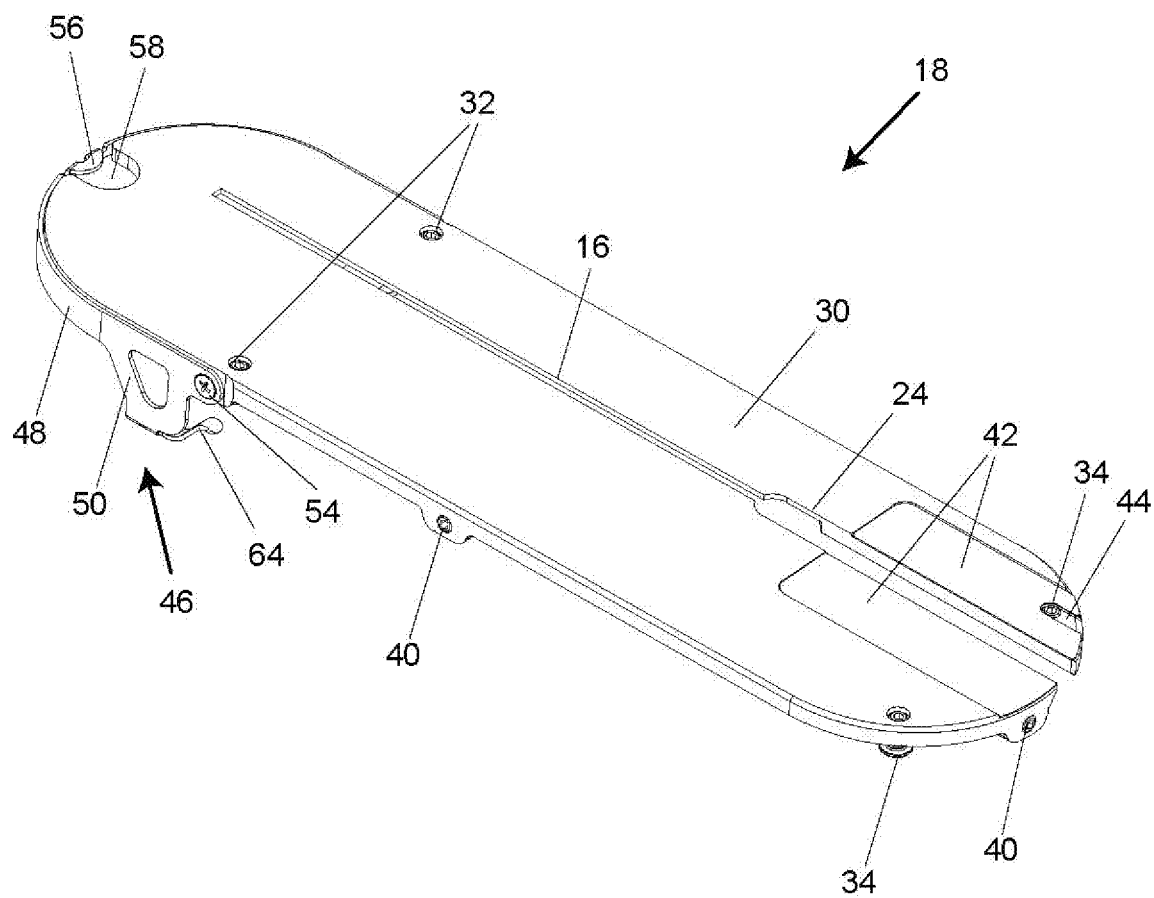
FIG. 2 shows a table insert with the lever of a locking mechanism pivoted down.
Figure 3:
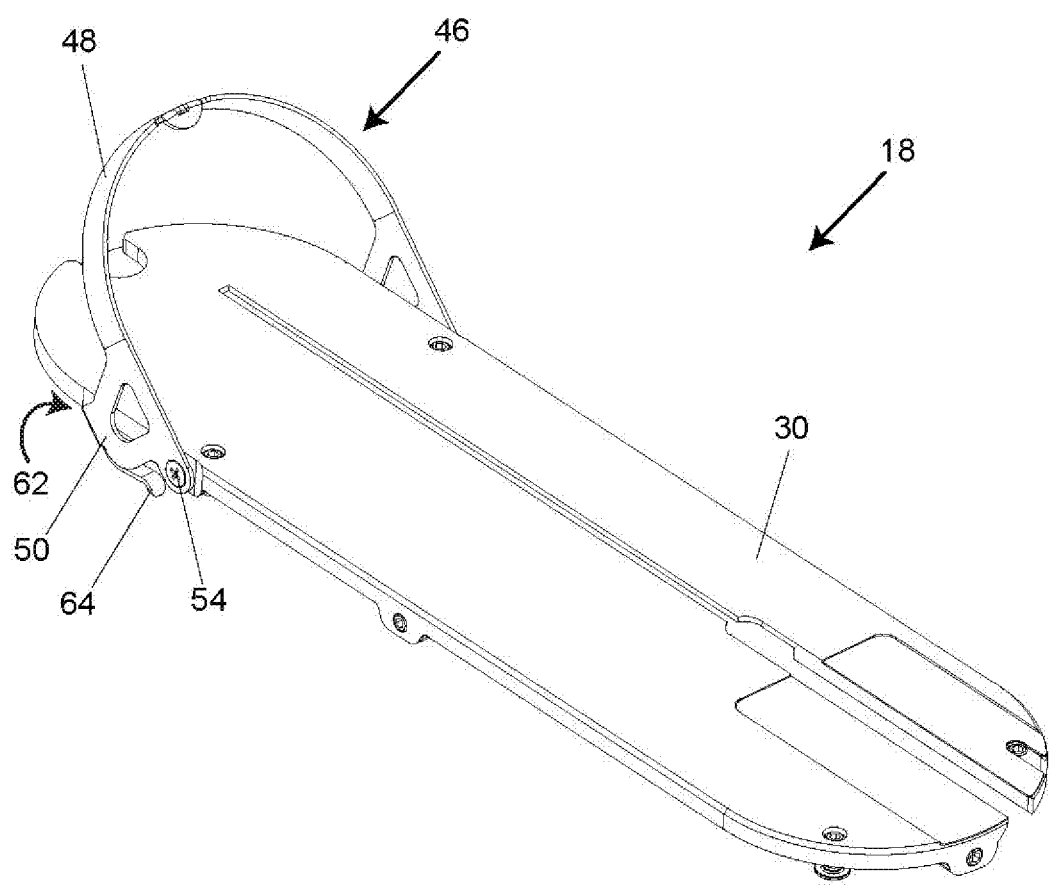
FIG. 3 shows a table insert with the lever of a locking mechanism pivoted up.
Figure 4:
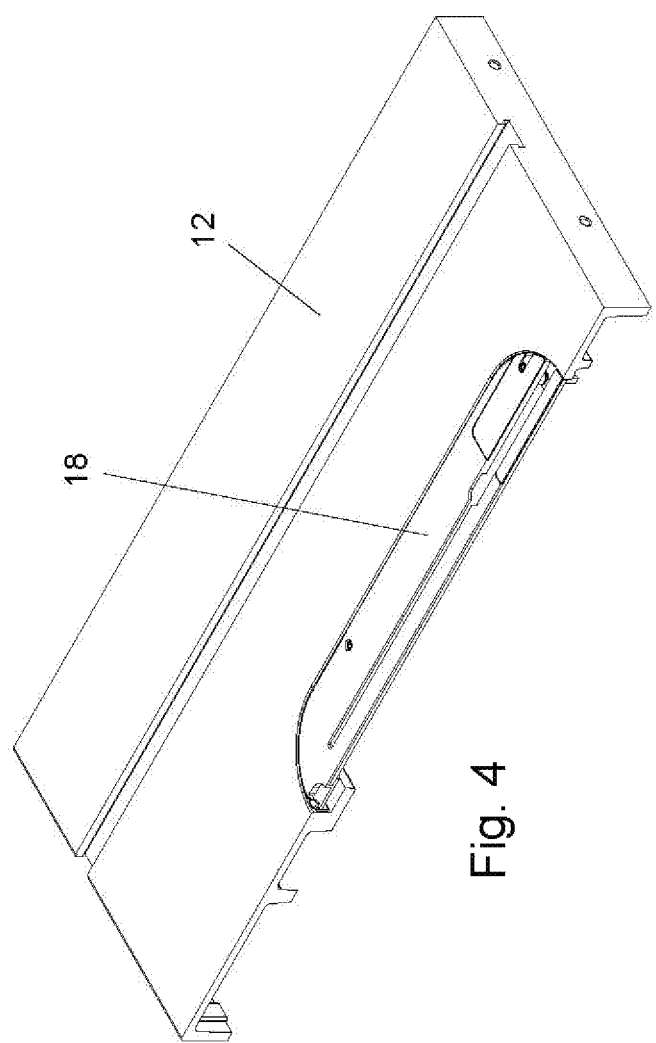
FIG. 4 shows a view of the table of the saw with some of the table and insert removed.
Figure 5:
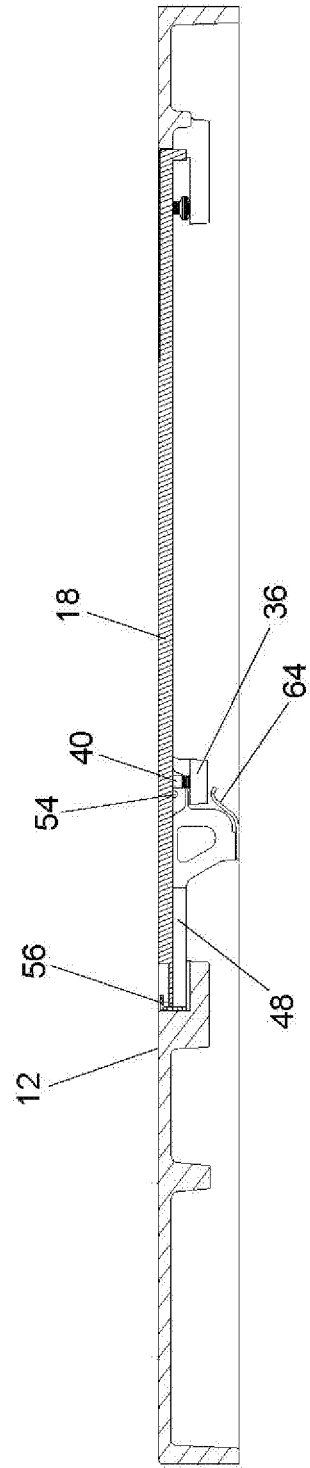
FIG. 5 shows a cross-sectional view of FIG. 4.
Figure 6:
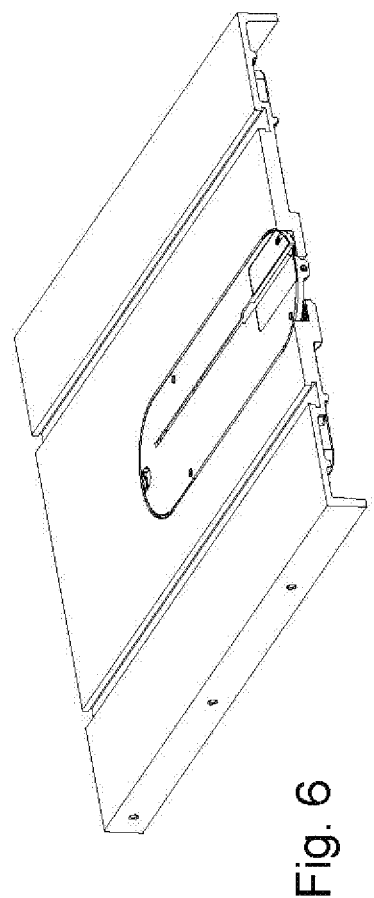
FIG. 6 shows a view of the table of the saw with some of the table removed.
Figure 7:
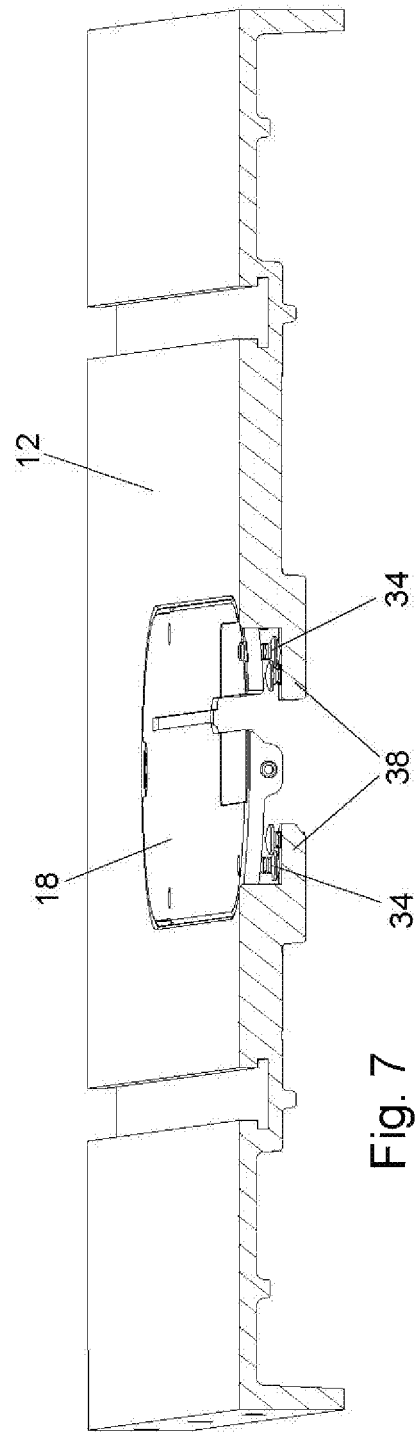
FIG. 7 shows a cross-sectional view of FIG. 6.

FIGS. 2 and 3 show table insert 18 isolated from the saw. The main body 30 of the table insert 18 may be made of a rigid material that resists warping, such as phenolic, or it may be made of plastic that is reinforced by an inner plate of steel or some other metal. Two front leveling screws 32 and two rear leveling screws 34 are installed in the table insert. The ends of the leveling screws adjacent the top of the insert have a molded hexagonal inset in which the end of a hex wrench can be inserted to turn the screw. The opposite or lower ends of the front and rear leveling screws contact ledges 36 and 38, respectively, that extend underneath the table insert from the underside of table 12, as shown in FIGS. 5 and 7. The screws allow the operator of the saw to adjust the height of the table insert so that the surface of the table insert is flush, or nearly flush, with the surface of table 12. Two positioning set screws 40, one along the middle of the right side of the table insert and one towards the middle of the rear side of the table insert, allow the table insert to be adjusted so that it fits snuggly side-to-side within opening 20. Two generally rectangular metal plates 42, one along either side of opening 24 in the table insert, provide hard contact surfaces for the sharp tips of anti-kickback pawls that are typically mounted to a splitter incorporated in a blade guard. A small cutout 44 in the left plate helps prevent an anti-kickback pawl from catching on the rear leveling screw.

The rear of insert 18 is held securely in place by the rear leveling screws 34. The bottom end of each rear leveling screw includes a head that overlaps the heads of screws threaded into tabs 38 on table 12, as shown in FIG. 7. The overlap locks down the rear of the insert and prevents the rear of the insert from rising up. As the table insert is installed or removed, the front end is held higher than the back end so that the table insert is at a slight angle. This allows the heads of the rear leveling screws to slide under, or out from under, the heads of screws that are mounted in the table on ledges 38.

The front of table insert 18 is held securely in place within opening 20 by a mechanical locking mechanism that consists of a lever 46 that works in conjunction with ledges 36 formed on the underside of table 12. As shown in FIGS. 2 and 3, lever 46 has a handle 48 made of a narrow strip of metal bent to form a semi-circular shape that matches the front end of insert 18. In order for the table insert to fit within opening 20, some material from the main body 30 of the table insert is removed at the front end so there is room for lever 46 to fit along the outside of the main body.

FIGS. 8-11 show various views of lever 46 isolated. There is a hole 52, shown in FIG. 8, at each end of handle 48, and a screw 54 passes through each hole to attach each end of lever 46 to the right and left side of the insert 18 in such a way to allow the lever to pivot upward about those screws, as shown in FIG. 3. A lift tab 56 is formed at the front of lever 46 by a small, semicircular shaped extension along the top edge of the lever, at the middle of the lever. The extension or tab is bent inward so that it is at a right angle to the front side of the lever. Table insert 18 has a recessed area 58 below lift tab 56 that is shaped so that tab 56 is substantially flush with the table top when the lever is down as shown in FIG. 2. The recessed area is also large enough to allow the operator of the saw to place a finger underneath the lift tab in order to lift lever 46 and pivot it upward.

Figure 8:
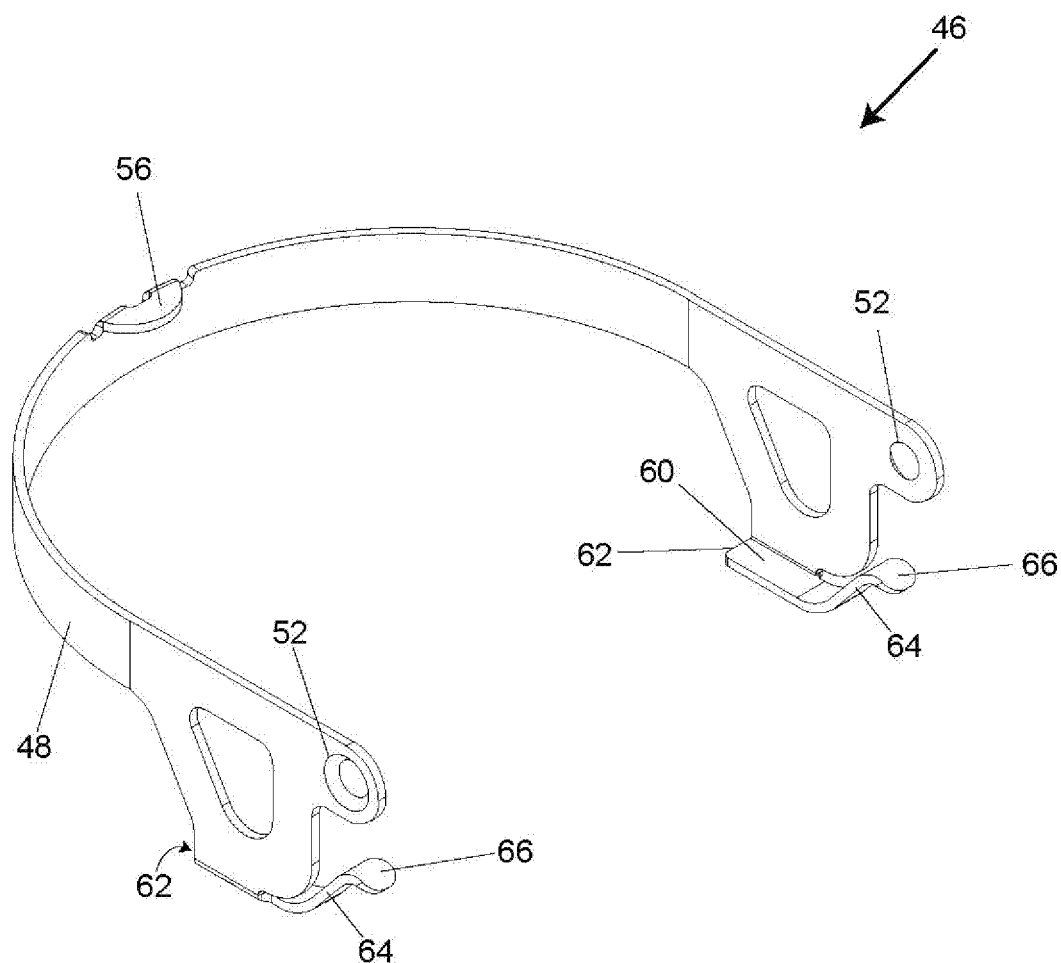
FIG. 8 shows the lever of a locking mechanism isolated.
Figure 9:
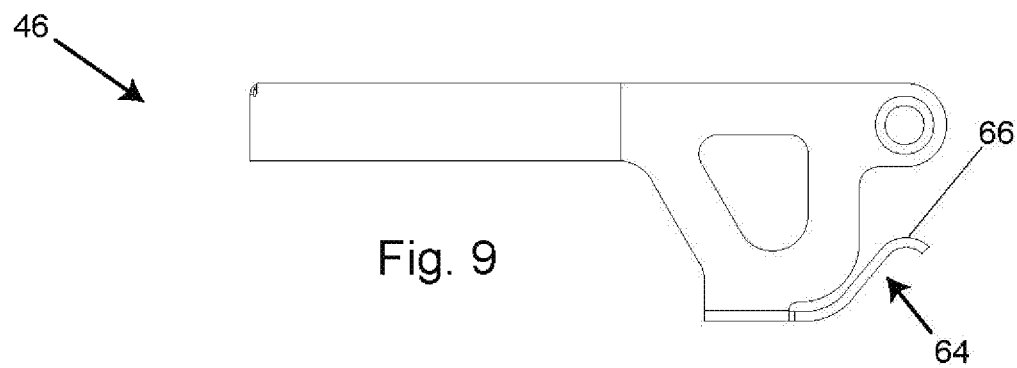
FIG. 9 shows a side view of the locking mechanism lever of FIG. 8.
Figure 10:
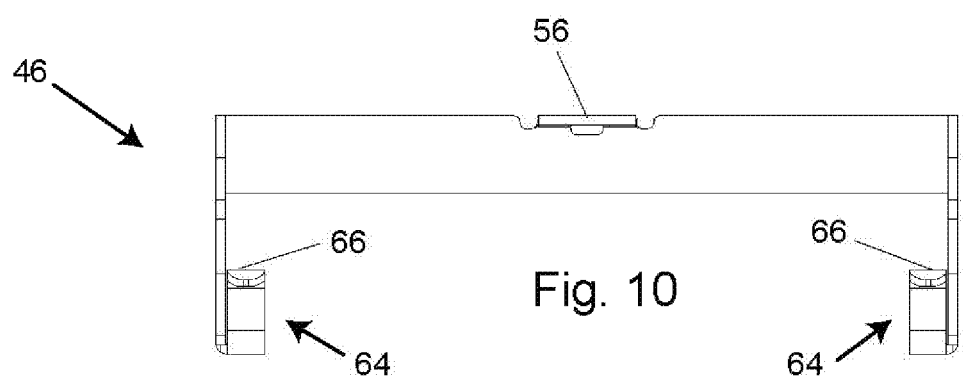
FIG. 10 shows a rear view of the locking mechanism lever of FIG. 8.
Figure 11:
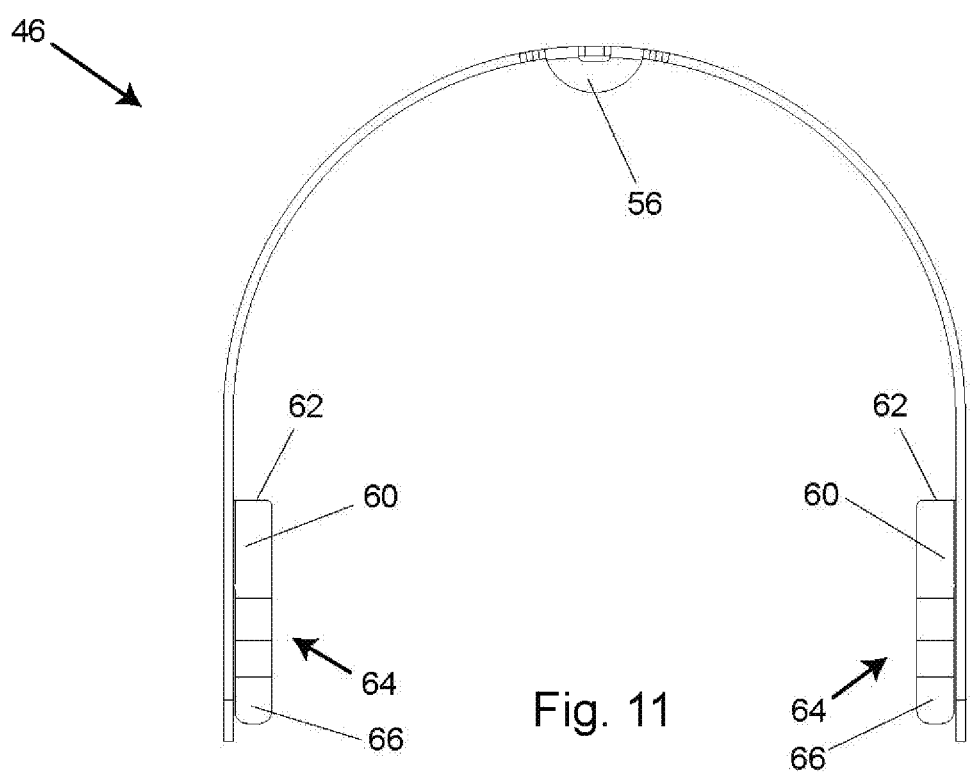
FIG. 11 shows a top view of the locking mechanism lever of FIG. 8.

Near each end of lever 46, just before holes 52, a side portion 50 extends down below the table insert, as shown in FIG. 2. At the bottom of each side portion, a projection bends inward at a right angle to create a tab 60, as shown in FIGS. 8 and 11. The front edge 62 of each tab 60 is shaped to contact the underside of table insert 18 when lever 46 pivots upward to limit how far the lever can pivot upward, as shown in FIG. 3.

The rear of each tab 60 extends out to form arms 64. Each arm 64 slopes upward for a length and then curves back down slightly at the end to terminate in contact areas 66, as shown in FIG. 8. Arms 64 are shaped and sized to fit under ledges 36 in the table when lever 46 is pivoted down to hold the insert in place.

As shown in the cross-sectional view of FIG. 5, arms 64 are positioned just below ledges 36 on either side of the table insert when the table insert is fully installed. There may be a small gap between the top of arm 64 and the underside of the ledge. In the case of an upward force on the table insert, contact areas 66 at the top of the curved ends of each arm 64 will contact the underside of ledges 36.

Contact areas 66 are positioned directly below the pivot axis of lever 46 (which runs through the center of each screw 54), or forward of the pivot axis (forward meaning toward lift tab 56) so that an upward force acting on the table insert will not tend to pivot lever 46 up; rather, lever 46 will remain locked in place. In the depicted embodiment the contact areas are directly below the pivot axes. If the contact areas were past the pivot axes toward the rear of the insert, an upward force on the table insert would tend to pivot lever 46 up and the table insert could be dislodged.

Figure 12:
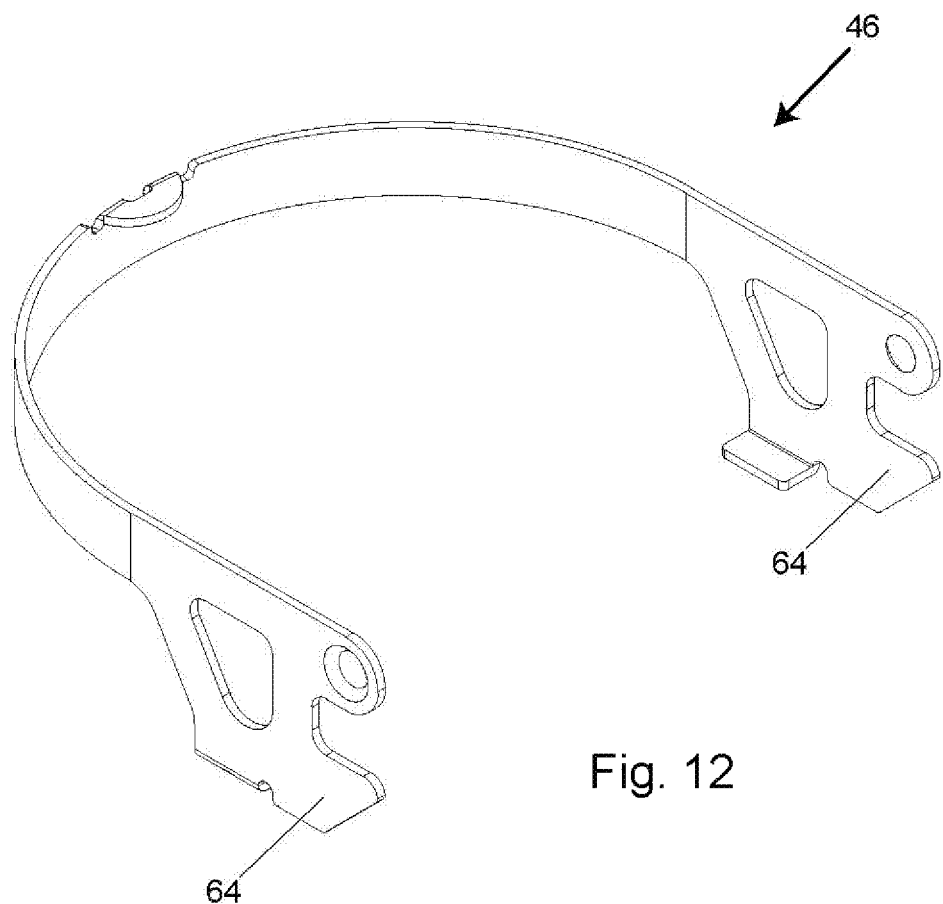
FIG. 12 shows and alternative embodiment of a lever.
Figure 13:
FIG. 13 shows a side view of the alternative lever of FIG. 12.

Arms 64 are strong enough to resist an upward force on the table insert, but also flexible enough to be bent with a tool in order to fit under thicker or thinner ledges 36, as the thickness of the ledges may vary between different saw tables. An alternative configuration of arms 64 are shown in FIGS. 12 and 13. In this configuration, arms 64 are not configured to be bent to accommodate ledges 36 of varying thickness.

Figure 14:
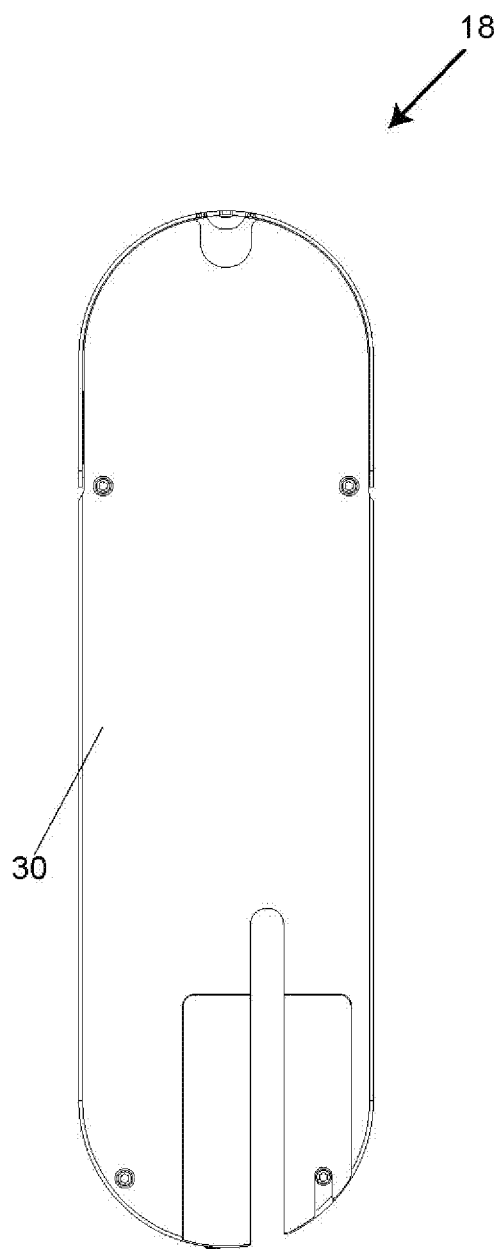
FIG. 14 shows a zero-clearance insert without a slot for a blade.
Figure 15:
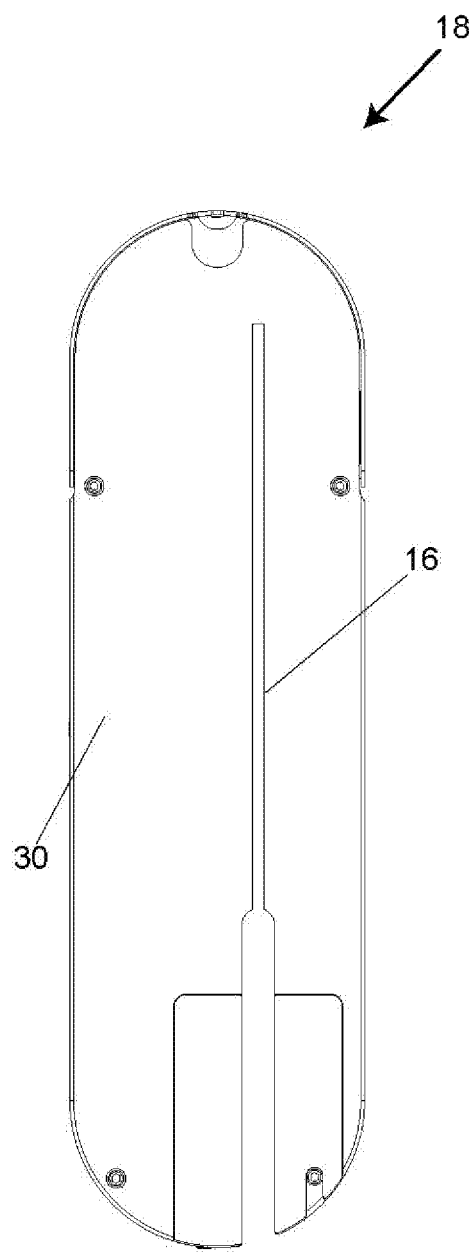
FIG. 15 shows a zero-clearance insert with a slot for a blade.

FIG. 14 shows a zero-clearance insert with a lock-down lever before the slot is cut for the blade. To cut a slot for the blade, a user would lower the blade and position the insert in the table opening and make sure the insert was locked down by the rear screws and the front lock-down lever. The user may also place a board across the top of the insert and clamp the board to the saw table. The user would then start the saw and slowly raise the blade. The spinning blade would cut a slot in the insert as the blade rises, and the lock-down lever and rear screws would help hold the insert in place against the upward force of the rising blade. A zero-clearance insert with a blade slot is shown in FIG. 15.

Lever 46 also acts as a handle when pivoted up, which can be used to facilitate installation or removal of the insert from the saw. To remove the insert, a user would place a finger under lift tab 56, pivot lever 46 up to move arms 64 out from under ledges 36, hold and lift up the lever slightly to cause the front end of the insert to rise, and then slide the insert towards the front of the saw to disengage the overlapping rear screws and remove the insert from the saw. The process is repeated in reverse to install the insert in the saw.

Figure 16:
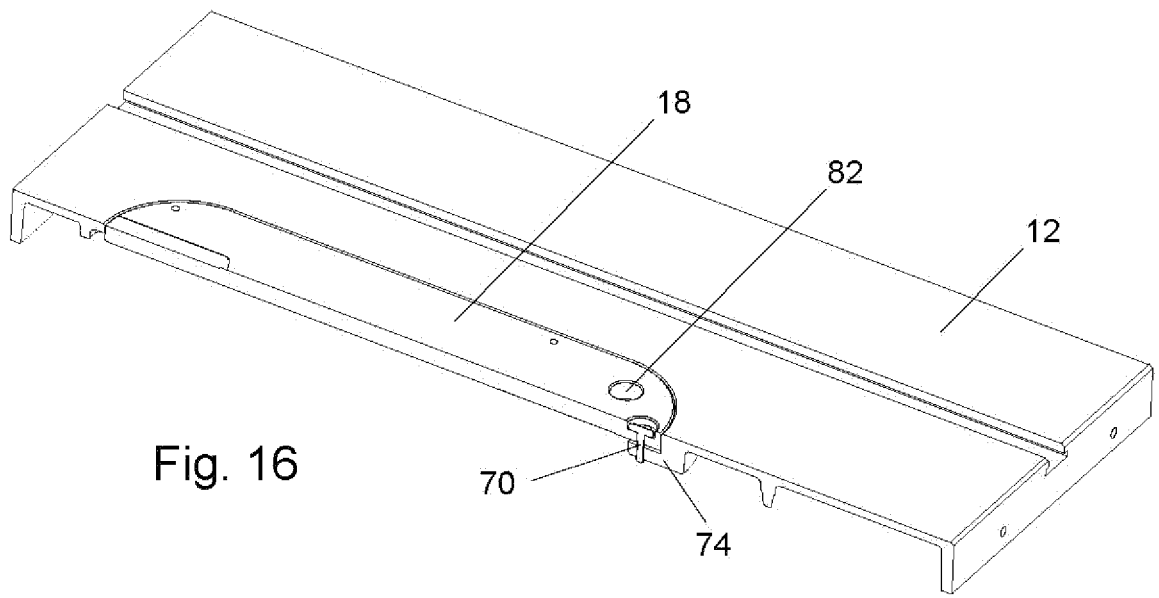
FIG. 16 shows, in cross-section, a lock-down mechanism using a T-shaped bolt.
Figure 17:
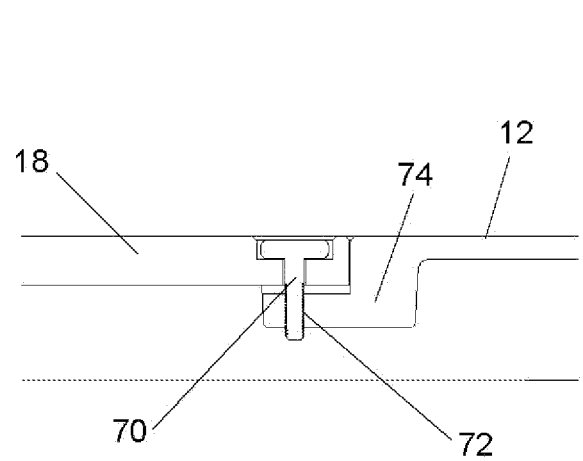
FIG. 17 shows a cross-sectional view of the T-shaped bolt in use.
Figure 18:
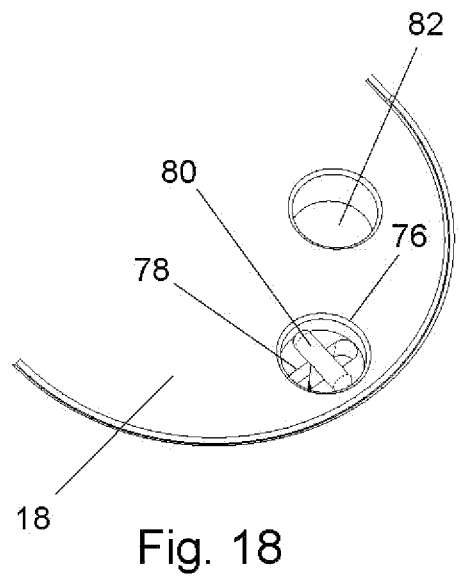
FIG. 18 shows the T-shaped bolt in a locked position.

FIGS. 16-18 show another embodiment of a lock-down mechanism for a table saw insert. The mechanism includes a T-shaped bolt 70 that threads into a threaded hole 72 in a ledge 74 that extends under the front of the insert from the underside of table 12. A large circular recess 76 in the top of the insert surrounds a slot 78 at the front of the table insert above hole 72. The bar 80 along the top of the T-lock, which forms the horizontal portion of the "T", sits within the circular cutout. The circular cutout is large enough that the operator of the saw may rotate the bar 80. When bar 80 is rotated so that it is at a 90 degree angle with slot 78, the table insert will be locked in place. When bar 80 is rotated so that it is parallel with slot 78, the table insert may be removed by placing a finger through another hole 82 in the insert and lifting the front end up allowing bar 80 to pass through slot 78.

Figure 19:
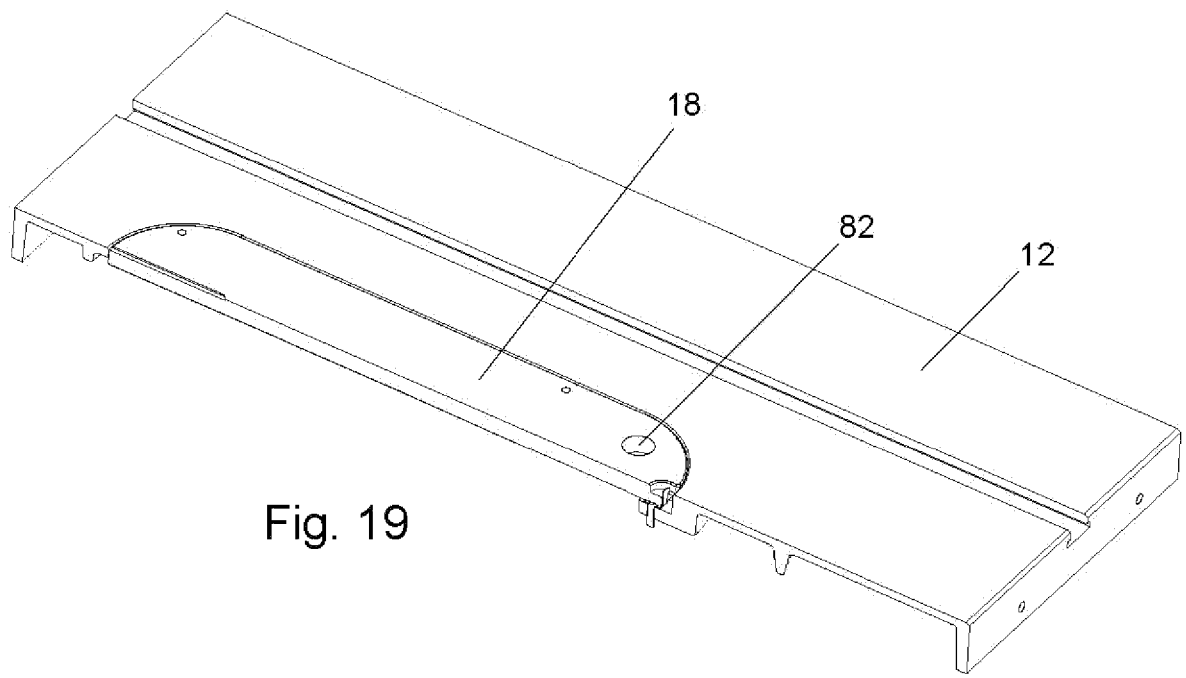
FIG. 19 shows, in cross-section, a lock-down mechanism using a tab.
Figure 20:
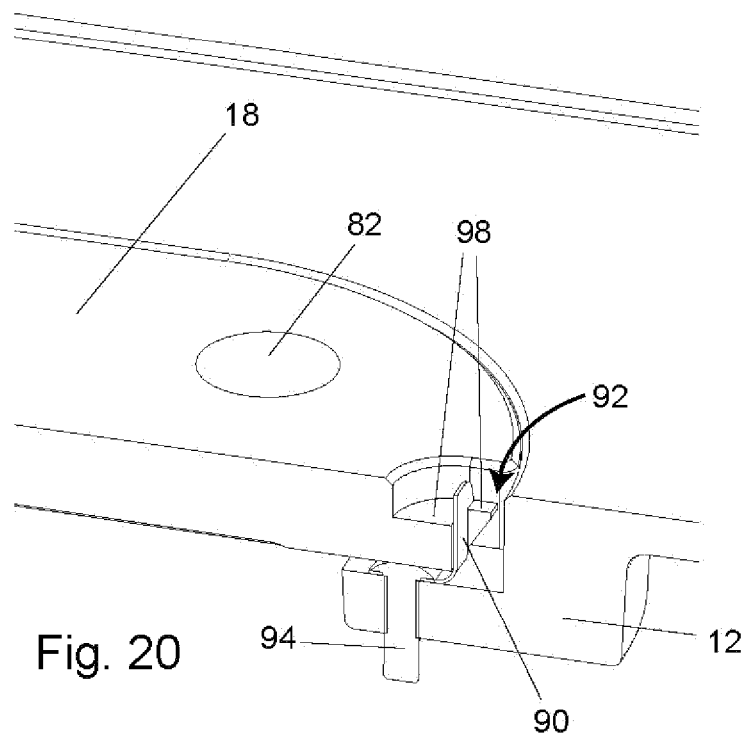
FIG. 20 shows a cross-sectional view of the tab of FIG. 19 in use.
Figure 21:
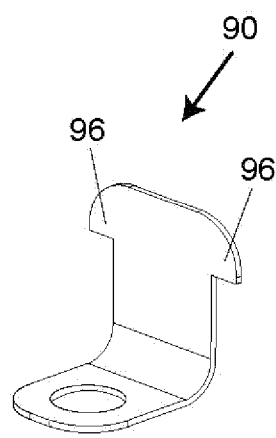
FIG. 21 shows the tab of FIG. 19 isolated from other structure.

FIGS. 19-21 show another lock-down mechanism to secure an insert in place. In this embodiment, a metal tab 90 is attached to the table under the insert and extends up through an opening 92 in the insert. In FIG. 20 the tab is attached to the table by screw 94. Normally, the tab is in a closed position with the shoulders or edges 96 of the wider top portion of the tab resting upon a sunken surface 98 on the insert. To release the insert, a user flexes the tab so that the upper portion of the tab is moved off of surface 98 into opening 92 where it clears the table insert. With the tab flexed, a user reaches through opening 82 in the insert to lift and remove the insert.

Figure 22:
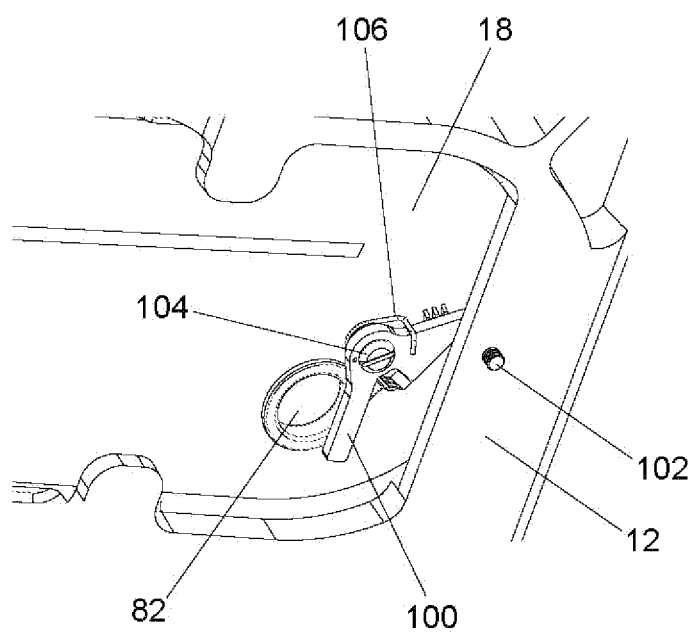
FIG. 22 shows a lock-down mechanism using a latch.

FIG. 22 shows another lock-down mechanism to secure an insert in place. In this embodiment, a latch 100 pivots under the insert to hold the insert in place. The latch 100 may be designed to lock the insert in place in many different ways. For example, the latch may pivot so that one end of the latch is under table 12 or it may pivot so that a notch in one end of the latch fits under the head of a screw 102 that is threaded into the table. In any case, latch 100 pivots around screw 104 and a spring 106 biases the latch closed. To open the latch and remove the insert, a user reaches through opening 82 in the insert, pivots the latch and lifts up the insert.

The lock-down structures described herein may be thought of as mechanical lock-down means for holding the insert in place. These lock-down structures hold an insert in place, and prevent the insert from moving up, through a physical abutment of parts or through what may be thought of as an inelastic interaction of parts, while still allowing a user to release the lock-down structure and remove the insert without the use of a screwdriver, wrench or other tool. For example, arms on a lever may abut or interact with a ledge, and the lever may be pivoted by hand to release the interaction. The top of a T-shaped bolt may abut or interact with a surface on the insert, and the T-shaped bolt can be turned by hand to release the abutment. An edge or shoulder on a tab may abut or interact with a surface on an insert, and the tab can be flexed to release the abutment. A latch may abut or interact with a screw or some other surface, and a user can pivot the latch to release the interaction. These types of interactions may be referred to as positive mechanical interactions or as hand-operable mechanical locks. These structures would have to undergo an inelastic deformation for the insert to be removed other than by releasing the lock-down structure. This is in contrast to prior mechanisms used to keep an insert in place, such as spring-biased buttons, spring-biased rollers, or leaf springs designed to flex into and out of a notch. These types of mechanisms do not hold the insert in place against an upward force, such as a user pulling up on the insert to remove the insert, or such as cutting a slot in a zero-clearance insert, and therefore do not mechanically lock the insert down.

INDUSTRIAL APPLICABILITY

The table inserts with toolless lock-down mechanisms disclosed herein are applicable to woodworking power tool equipment, and particularly to table saws. The described inserts provide a simple and effective means for securing and removing an insert without the use of tools.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element of the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
    a table;
    a blade configured to extend at least partially above the table when cutting; and
    an insert with a mechanical lock-down;
    where the insert is configured to be installed and removed by hand without tools; and
    where the mechanical lock-down is configured so that when the insert is installed in the saw the mechanical lock-down can be moved by hand without tools between an engaged condition and a non-engaged condition;
    where the mechanical lock-down prevents the insert from being removed by an inelastic interaction of parts when in the engaged condition;
    where the inelastic interaction of parts includes a component supported at least partially by the table, and the component includes an edge that abuts a surface on the insert in the engaged condition but not in the non-engaged condition; and
    where the mechanical lock-down does not prevent the insert from being removed when in the non-engaged condition.

2. The table saw of claim 1, where the component is a T-shaped bolt.

3. The table saw of claim 1, where the component is a tab.

* * * * *